(12) United States Patent
Calkowski et al.

(10) Patent No.: US 9,355,116 B2
(45) Date of Patent: *May 31, 2016

(54) CROSS-FILE DIFFERENTIAL CONTENT SYNCHRONIZATION USING CACHED PATCHES

(71) Applicant: VMware, Inc., Palo Alto, CA (US)

(72) Inventors: Grzegorz Calkowski, Winchester, MA (US); Mingzhe Zhuang, Belmont, CA (US)

(73) Assignee: VMware, Inc., Palo Alto, CA (US)

( * ) Notice: Subject to any disclaimer, the term of this patent is extended or adjusted under 35 U.S.C. 154(b) by 402 days.

This patent is subject to a terminal disclaimer.

(21) Appl. No.: 13/784,557

(22) Filed: Mar. 4, 2013

(65) Prior Publication Data

US 2014/0250067 A1  Sep. 4, 2014

(51) Int. Cl.
*G06F 7/00* (2006.01)
*G06F 17/00* (2006.01)
*G06F 17/30* (2006.01)

(52) U.S. Cl.
CPC .................. *G06F 17/30174* (2013.01)

(58) Field of Classification Search
CPC .............. G06F 17/30283; G06F 2212/151; G06F 17/30215; G06F 17/30159
USPC ............ 707/624, 640, 770, 803; 709/213; 711/163
See application file for complete search history.

(56) References Cited

U.S. PATENT DOCUMENTS

| | | | |
|---|---|---|---|
| 7,620,766 B1 * | 11/2009 | Waldspurger | 711/6 |
| 2004/0186861 A1 | 9/2004 | Phatak | |
| 2005/0022175 A1 | 1/2005 | Sliger et al. | |
| 2007/0094348 A1 * | 4/2007 | Scheidel et al. | 709/217 |

(Continued)

FOREIGN PATENT DOCUMENTS

| | | |
|---|---|---|
| JP | 2005044360 A | 2/2005 |
| JP | 2006516341 A | 6/2006 |

(Continued)

OTHER PUBLICATIONS

Notification of Transmittal of the International Search Report and the Written Opinion mailed Jun. 6, 2014, International Application No. PCT/US2014/020023, filing date Mar. 3, 2014, Patent Cooperation Treaty "PCT", Alexandria, Virginia, pp. 1-11.

(Continued)

*Primary Examiner* — Susan Chen

(57) ABSTRACT

Methods, systems and techniques for synchronizing content, such as a file, between one or more clients and one or more servers are provided. Example embodiments provide a Cross-File Differential Content Synchronization System (CDCSS) to synchronize files between remote systems in a nearly instantaneous manner without necessitating the transfer of the entire contents of a file. These components cooperate to transfer only the differences in data content wherever possible to a recipient system by providing a patch mechanism that instructs the recipient to build the modified or new data content based upon content it already has access to. In addition, in one embodiment the CDCSS synchronization solution provides a client-based index, rather than a server-based index, for tracking patches and files, which reduces the amount of computational and I/O overhead on the server and which does not require a negotiation between a client and a server to provide an update.

21 Claims, 8 Drawing Sheets

(56) References Cited

U.S. PATENT DOCUMENTS

| | | | |
|---|---|---|---|
| 2009/0271779 A1 | 10/2009 | Clark | |
| 2010/0281051 A1* | 11/2010 | Sheffi et al. | 707/770 |
| 2010/0306283 A1* | 12/2010 | Johnson et al. | 707/803 |
| 2011/0022883 A1* | 1/2011 | Hansen | 714/4 |
| 2011/0213869 A1* | 9/2011 | Korsunsky et al. | 709/223 |
| 2011/0214157 A1* | 9/2011 | Korsunsky et al. | 726/1 |

FOREIGN PATENT DOCUMENTS

| | | |
|---|---|---|
| WO | 03079213 A1 | 9/2003 |
| WO | 2006/001137 A1 | 1/2006 |

OTHER PUBLICATIONS

Athicha Muthitacharoen et al. "A low-bandwidth network file system", Proceedings of the Eighteenth ACM Symposium on Operating Systems Principles, SOSP '01. Oct. 21, 2001, New York, New York, USA, pp. 1, 2-8, Figures 1-4.
Dan Teodosiu et al. "Optimizing File Replication Over Limited-Bandwidth Networks Using Remote Differential Compression", Microsoft Corporation, http://research.microsoft.com/pubs/64692/tr-2006-157.pdf, Nov. 1, 2006 (Jan. 11, 2006), pp. 1-16.
Young Chan Moon et al., "Data Deduplication Using Dynamic Chunking Algorithm", Nov. 28, 2012, Computational Collective Intelligence. Technologies and Applications, Springer Berlin Heidelberg, Berlin, Heidelberg, pp. 1-10.
Purushottam Kulkarni et al.; Redundancy Elimination Within Large Collections of Files; Proceedings of the 2004; USENIX Annual Technical Conference, Boston, MA; Jun. 2004; 14 pages.
Athicha Muthitacharoen et al.; A Low-Bandwidth Network File System; Proc. 18th Symp. Operating System Principles, Banff, CA, Oct. 2001; 14 pages.
Michael O. Rabin; Fingerprinting by Random Polynomials, Technical Report TR-15-81, Department of Mathematics The Hebrew University of Jerusalem and Department of Compute Science, Harvard University, 1981; 14 pages.
Christopher Soghoian; How Dropbox Sacrifices User Privacy for Cost Savings; http://paranoia.dubfire.net/2011/04/how-dropbox-sacrifices-user-privacy-for.html; Apr. 12, 2011; 22 pages.
Andrew Tridgell et al.; The RSYNC Algorithm; TR-CS-96-05; Jun. 18, 1996; Department of Computer Science Australian National University Canberra, ACT 0200, Australia; 8 pages.
Athicha Muthitacharoen, et. al., "A Low-bandwidth Network File System", Proceedings of the Eighteenth ACM Symposium on Operating Systems Principles, U.S., ACM, Oct. 21, 2001, vol. 35, Issue 5, pp. 174-187, ISBN 1-58113-389-8.
Office Action of Feb. 9, 2016 in related Japanese Patent Application No. 2015-520728 (in Japanese, translation is provided).
Office Action of Feb. 9, 2016 in related Japanese Patent Application No. 2015-520728 (English translation).

\* cited by examiner

CROSS-FILE DIFFERENTIAL CONTENT SYNCHRONIZATION USING CACHED PATCHES

TECHNICAL FIELD

The present disclosure relates to methods, techniques, and systems for file synchronization.

BACKGROUND

In a typical enterprise environment, users may employ a variety of client devices and client computing systems to use, share, and update their files which are stored remotely, for example, in a public or private computing "cloud." Here a computing cloud refers to computing resources, including software, which are delivered typically as a service over a network such as the Internet. The files are remotely stored on one or more server computing systems in, for example, a network file system or other network storage, and are accessible via a network, for example, a wide area network (WAN) such as the Internet, a private WAN, or a local area network (LAN). Client devices may include devices such as personal computers, tablets, laptop computers, smart phones, and other mobile devices, some of which have limited resource capacities.

Remote access to files, especially over a WAN, may be subject to bandwidth problems (such as too much data transferred over slow connections) which may lead to latency problems and ultimately an ineffective and frustrating user experience. These problems can be especially frustrating when there are small incremental changes to a file that still result in the entire file being transferred back and forth between one or more client devices and one or more server computing systems. For example, a typical enterprise user may make many modifications to the same spreadsheet file, presentation, or document in a single day, which the user wishes to share with another user for collaborative purposes. The modified file may be thus transferred back and forth several times in a single day.

Accordingly, the ability to provide efficient data transfer can make or break the user experience and can additionally translate into cost savings for limited resource client platforms, such as mobile users, that subscribe to usage based data plans.

DETAILED DESCRIPTION

Figure 1:
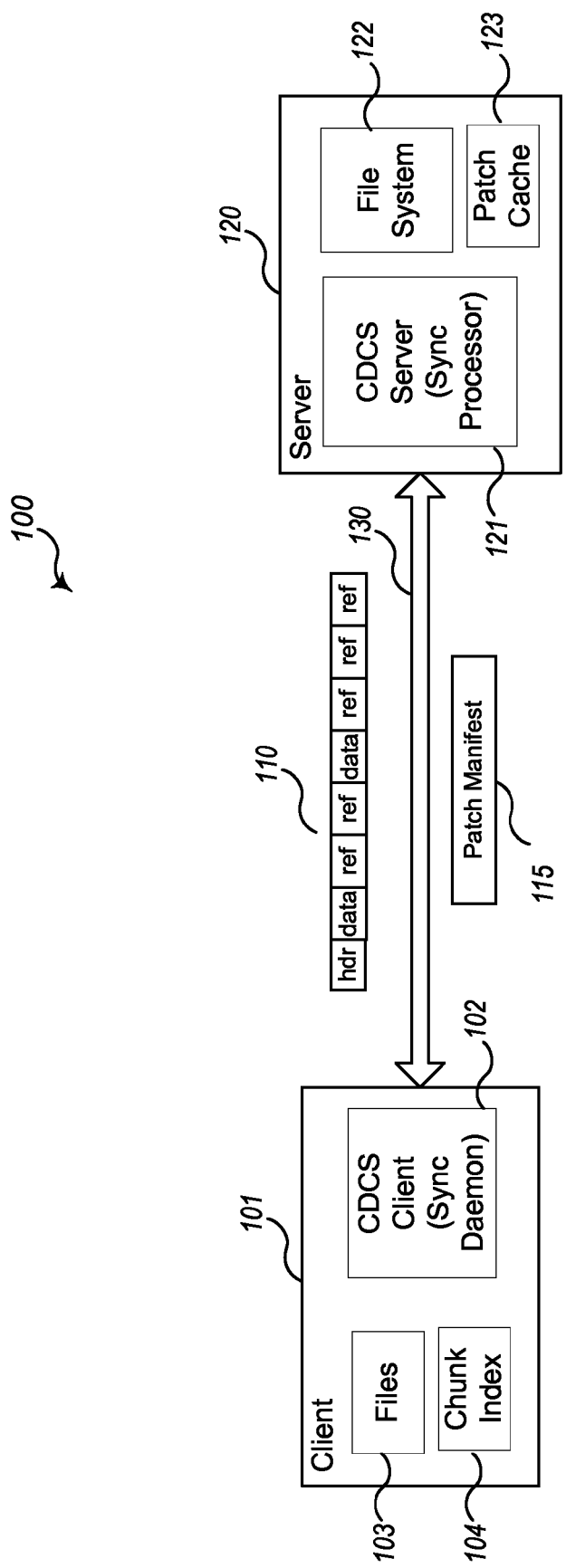
FIG. 1 is a block diagram of an example environment for deploying a Cross-File Differential Content Synchronization System.

Embodiments described herein provide enhanced computer- and network-based methods, systems, and techniques for synchronizing content, such as a file, between one or more clients (e.g., client computing systems) and one or more servers (e.g., server computing systems). Example embodiments provide a Cross-File Differential Content Synchronization System (CDCSS) to synchronize files between remote systems in a nearly instantaneous manner without necessitating the transfer of the entire contents of a file. In particular, the CDCSS transfers only the differences in data content wherever possible to a recipient system by providing a patch mechanism that instructs the recipient to build the modified or new data content based upon content it already has access to. In addition, in one embodiment the CDCSS synchronization solution provides a client-based index (rather than a server-based index, or joint client and server indexes, which may be provided in other embodiments) for tracking patches and files, which reduces the amount of computational and I/O (input/output) overhead on the server and which does not require a negotiation between a client and a server to provide an update. This works well especially for "thick" clients such as desktop and laptop computers that have sufficient computing power to offload work from the server. Additionally, updates can be provided efficiently from the server to a remote client, such as when downloading updates to a mobile phone, by limiting the amount of duplicate data transferred by the server and ultimately stored at the remote client.

In example embodiments, the CDCSS comprises a client portion, termed the Cross-File Differential Content Synchronization (CDCS) client, and a server portion, termed the Cross-File Differential Content Synchronization (CDCS) server, which cooperate to transfer a "patch" between two computing systems when synchronization is desired. The patch is a representation of the file content that includes new data for the portion of the file content that has changed (or cannot otherwise be located in another file) and references to locations of data that has not changed and is locatable elsewhere. A patch thus provides a "differential synchronization" or "differential sync"—that is a synchronization (or "sync") of just the difference in the content, before and after the content has been updated or created. As used herein, a "file" refers to any type of file content regardless of how it is stored (e.g., a portion of a file, an object, stored data, or the like), and can include content such as text, video, image, binary, or other data. Each patch contains a plurality of segments (e.g., records, portions, etc.); each segment contains data content (directly) or a reference (e.g., an indicator, pointer, description, etc.) to another file location where data content may be located.

A patch may be considered a "cross-file" patch because it may refer to data that is stored in one or more other files. Consider, for example, a letter produced using a letterhead template of a company. The company logo may be stored and locatable in one file, the address of the letter's addressee in a contact directory, and the contents of the letter yet in a third file. An example patch produced by the CDCSS may contain the actual contents of the letter, a reference to the area in the second file that contains the company logo (including specific location information) and a reference to a third file that contents the addressee information. By using references to locations within the second and third files when they already exist on the recipient computing system, the patch mechanism avoids sending duplicate data that is already present on the recipient computing system.

When a file is newly created or modified, for example, by a client device acting as a "producer" of information (e.g., a producer client device), the client device computes a patch and sends the patch to a destination or recipient server. The server processes the patch in conjunction with already stored data to create the new or modified file. Later, when another client device (e.g., a "consumer" of data) is updated with the new or modified file (e.g., when a file is synchronized, requested, etc.), instead of sending the entire file, the server can just send the patch that was already computed by the producer client device to the client device acting as the consumer (e.g., a consumer client device). The consumer client device is responsible for creating its own new or modified file by processing the patch using files it already has and/or by downloading any missing information. Thus, a new or modified file may be shared with others by computing a patch (using the differential sync mechanism) and uploading it to a server (e.g., in the cloud), which constitutes/reconstitutes the file and caches the patch so that it can be propagated (e.g., by downloading) to other computing systems.

In some embodiments, the patch is cached for some period of time (e.g., set, preset, configured, etc.) or according to some algorithm (e.g., least recently used, least frequently used, FIFO, etc.) and then flushed from the cache when the time period expires or the algorithm so dictates. Upon deletion of the patch from the cache, a consumer client receiving the update may receive the entire file contents instead of the patch. In addition, in some embodiments, for example, when the patch is no longer cached or available, the server may re-compute the patch as needed. In either case, when the consumer client receives the patch for processing it need not know whether it was the original patch created by the producer client device or a new patch created by the server. In some embodiments, where storage is practically speaking limitless, patches may be cached without deletion or expiration.

In some cases, a client device may further publish information created by others (e.g., a client device acting in publisher capacity) by efficiently uploading this information to the server and disseminating it through patches. To the extent the information to be published depends upon other information already existent on the publisher client device, a patch may be computable and disseminated. To the extent it does not so depend, the entire information to be published may need to be sent to the server.

When deployed as described, the CDCSS optimizes the information transferred by reducing the amount of duplicated data transferred among systems. This is particularly useful in an environment where data transfer may be slow or costly and provides for near instantaneous (e.g., near real-time) synchronization of incrementally modified content. The CDCSS techniques take advantage of the high probability of similar data residing on a particular computing system and accordingly manage smaller indexes on a distributed basis (each client) rather than managing a large global de-duplication scheme. In addition, the CDCSS may be retrofit into an architecture designed without de-duplication in mind because the components are separate from the file system and other system aspects.

FIG. 1 is a block diagram of an example environment for deploying a Cross-File Differential Content Synchronization System. Environment 100 includes at least one client computing system (client) 101 and at least one server computing system (server) 120. The client 101 communicates with the server 120 to synchronize files. As mentioned above, such communication and synchronization may take place over communications mechanism 130, which may be a network such as a LAN, WAN, or over some communications gateway. The server 120 may be a server in the "cloud" and may be deployed as a software as a service (SAAS) application on some host computing system unknown to the client 101.

Client 101, through the use of the CDCS client 102, sends one or more patches, such as patch 110, to server 120 over the communications mechanism 130. In order to synchronize a new or modified file that the client 101 has generated (or stored as a file in file storage 103), the client 101 computes a patch 110 that describes the difference in the file content, before and after modification, as described in detail further below with reference to FIGS. 3, 4, and 6. Server 120, through use of the CDCS server 121, receives one or more patches, such as patch 110, from client 101 over the communications mechanism 130. As will be described further with respect to FIG. 7, the patch 110 may be received in segments (e.g., records, portions, etc.) and processed in a pipeline (e.g., sequentially or via stream processing). Each patch is processed to generate a file (or file version) which is stored in file system 122. Additionally, a copy of the patch 110 is cached in patch cache 123 for further distribution to synchronize/update other clients (not shown). In addition, when the server 120 further distributes a patch to synchronize/update a client (for example, to send another patch 110 to update client 101), the server 120 computes and sends patch manifest 115 which contains a listing of all files that are referred to in the patch 110. This way, the recipient computing system can first verify that a referred-to file indeed exists, and if it does not, either choose to request the entire file in total, or request the data content from the referred-to file instead of just processing the reference.

The client 101 computes patch 110 based upon a local chunk index 104, which contains an index to portions of files that the client 101 knows about and believes exist on server 120. In one embodiment, each file of the CDCSS is divided into one or more chunks of data (data content) from bytes 1 to N in a linear fashion. Non-overlapping chunks of data of variable sizes are determined based upon their content using a technique referred to as "content-defined chunking" (CDC). Different algorithms, such as "Rabin fingerprinting," may be incorporated into the CDCSS for dividing up the file into chunks and for representing the file content. Once the file has been divided into chunks, for each chunk, a hash is computed and indexed in the local chunk index 104. The hash for each chunk is associated with the location information for the chunk, for example, a file identifier and offset, so that, based upon the indexed hash, the location information for the chunk can be identified. In some embodiments the hash is a strong cryptographic hash (e.g., SHA-256) of the content of the chunk, although in other embodiments, other hashes and/or other identifiers may be incorporated.

When file content is modified or created, the CDCSS divides the file into chunks (e.g., using the Rabin fingerprinting algorithm) and determines whether each chunk is already present in the local chunk index 104 or not by looking up the hash of the chunk in the chunk index 104. Any data structure for representing the local chunk index 104 may be used, including, for example, a list, file, database, array, table, etc. In the case where the chunk is already present in the local chunk index 104, the CDCSS generates reference information in the patch 110 that represents that chunk of the file. In the case where the chunk is not already present, the CDCSS stores the data content information for that chunk in the patch 110. In this manner, the CDCSS builds up the patch 110 sequentially by examining the file, chunk by chunk. As a result, the patch 110 can be forwarded (e.g., sent, transferred, communicated, etc.) to a recipient in parts as it is created (or, in some embodiments, after the whole patch is computed) to be processed sequentially, for example, in a pipeline, as it is received. Of note, the format of the patch is independent of the chunking algorithms used and how the patch is created. Thus, the patch can be processed when received without knowledge of the details of how it was created—just that it contents content and references to content and how to process the patch itself.

In one embodiment, a "Rabin fingerprinting" algorithm is employed to determine the chunk boundaries of a file and to thus select chunks for the file. The process of fingerprinting the content is also referred to as "chunking" Rabin Fingerprinting is described in detail in Rabin, Michael O., *Fingerprinting by Random Polynomials, Technical Report TR*-15-81, Center for Research in Computing Technology, Harvard Univ., 1981, which is incorporated by reference in its entirety. Use of Rabin fingerprinting for content-defined chunking (CDC) is described in Muthitacharoen et al., *A Low-Bandwidth Network File System*, Proc. 18$^{th}$ Symp. Operating System Principles, Banff, Calif., October, 2001, which is incorporated by reference herein in its entirety. In summary, a Rabin fingerprint is defined as the reminder from the division of the polynomial representation of a sequence of bytes divided by a preselected irreducible polynomial. The fingerprint offers a strong probability that two different sequences of bytes will have different fingerprints. The fingerprint of a sliding window of bytes of the file (between 40 and 64 bytes) is calculated, much like a rolling checksum. When the least significant 13 bits of the window's fingerprint equal a preselected "magic" value, the end offset of the window is considered to be a chunk boundary. A minimum and maximum size of the chunks can be configured and tuned as desired. In one embodiment, they are set to 4 KB and 16 KB respectively. The rolling checksum like calculation present in the Rabin fingerprint algorithm and similar algorithms provide a balance of reliability and speed.

Of note, other algorithms may be incorporated into an example CDCSS. For example, any hashing algorithm with a reasonably uniform distribution could be used to fingerprint/chunk the file data. For example, hashes from a secure hash algorithm family such as SHA-1 or MD5 could be used, but they are generally more expensive to calculate.

Once the patch is sent, it can be processed "on the fly" as it is received, for example, by the recipient (server or a consumer client). As described further with respect to FIG. 7, the server or other recipient can process the patch in a linear fashion to generate a file from its contents without needing any chunk index, including without needing its own chunk index. The patch format alone describes a recipe for generating the file from its contents. The new or modified file is constructed by appending the data content that is embedded in the patch and by copying chunks of data content from other files that are referred to in the patch. As a result, the CDCS techniques may be used with or retrofit into computing systems that were not set up for differential sync or to use de-duplication processes. In particular, as long as the client runs the CDCS client (e.g., the sync daemon process) and the server runs the CDCS server (e.g., the sync processor), the client and server can communicate to provide differential sync without further modifications.

Because of the patch format and the techniques for generating and forwarding the chunk index, the CDCSS is able to perform a differential sync of file content based solely upon client-side knowledge of what is contained in the index without any negotiation with the recipient server to see if content is available on the server. In particular, in environments where the server stores every file immutably (e.g., all files, versions, etc. are stored or accessible forever), the producer client can assume that if a file is referred to by its chunk index, then the file exists on the server (unless there is an error in the chunk index, which can be fixed by notification of the client). Further, files that may have been deleted on the client may still be referred to by the chunk index of a client for some period of time or indefinitely dependent upon the design and implementation of the chunk index. Since these files are immutable on the server (e.g., not ever deleted in a practical sense, although they may be archived), a patch can be created that takes advantage of the presence of the file still on the server, even though it no longer exists on the client, to reduce the amount of data forwarded by the client in a sync operation. This aspect may be particularly useful in a "Save As New File & Delete Original File" scenario.

Figure 2:
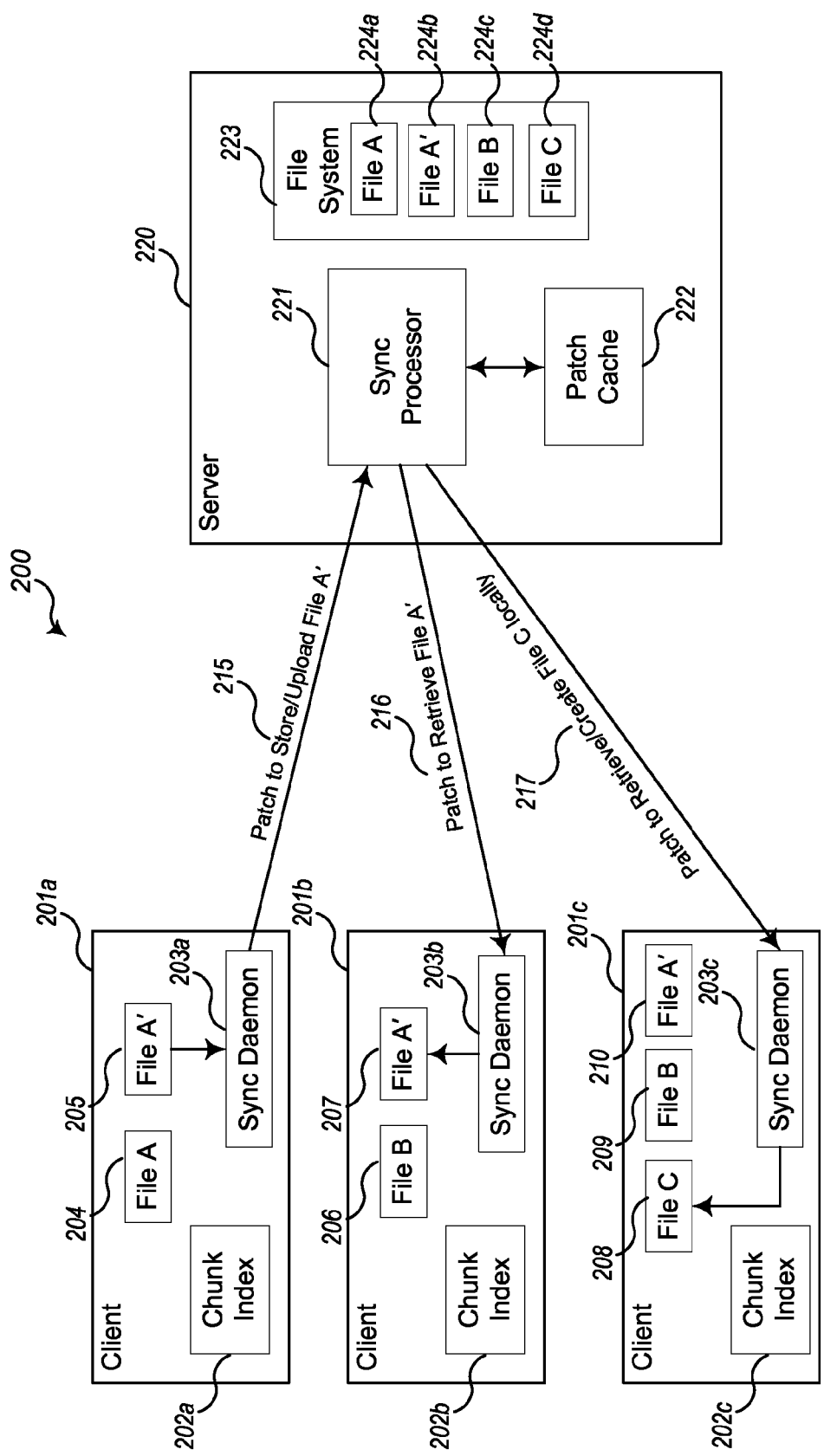
FIG. 2 is a block diagram of example clients using the Cross-File Differential Content Synchronization System to synchronize files to an example server and each other.

FIG. 2 is a block diagram of example clients using the Cross-File Differential Content Synchronization system to synchronize files to an example server and each other. According to example 200, a plurality of client computing systems 201a, 201b, and 201c are communicatively connected to server computing system 220. Although not shown, clients 201a-201c may also be connected to a variety of other servers and may synchronize files to multiple of them. Each client 201a-201c has its own chunk index 202a, 202b, and 202c, respectively, and its own sync daemon (CDCS client) 203a, 203b, and 203c, respectively. The chunk indexes 202a-202c and sync daemons 203a-203c operate as described with respect to FIG. 1. The sync daemons 203a-203c are responsible for generating and forwarding patches to the server 220 when a client is acting in its producer role (modifying or creating a file) and are responsible for receiving and processing patches when the client is acting in its consumer role (receiving an update to a file or a new file).

A server file system 223 for storing files is associated with the server 220, and each client 201a-201c is responsible for synchronizing its files with server 220 so that they can be kept up to date and shared with other clients. In some embodiments the file system 223 is distributed; however the synchronization methods can still be employed to keep the files on all systems up to date. The server 220 also executes a sync processor (CDCS server) 221 which is responsible for processing received patches to create files, such as files 224a-224d, stored in the file system 223 associated with the server.

In the example illustrated, client 201a contains a file "A" 204, which it has modified—shown as File "A'" 205. As described in FIG. 3, File A' 205 has content based upon File A 204 with some modifications. Client 201A generates, through the use of sync daemon 203a, a patch 215 which it uploads to the server 220. Server 220, through its sync processor 221, processes patch 215 to generate a new file (or version), File A' 224b, which it stores in the file system 223. The sync processor 221 also builds up and/or stores a copy of patch 214 in the patch cache 222.

In example 200, client 201b uses its sync daemon 203b to download a copy of the patch used to generate File A' (here patch instance 216). Patch 216 is processed by the sync daemon 203b to generate its own copy of File A' 207 based upon references to its own copy of File A (not shown). Here client 201b is acting as a consumer client. In another instance client 201b sends a patch (not shown) to generate or update File B 206 on the server 220 also for sharing and synchronization. In this instance client 201b is acting as a producer client.

Also, in example 200, client 201c, who has previously downloaded/updated a copy of File B 209 from server File B 224c storage and File A' 210 from server File B 224b storage (either through a full file content download or by previously receiving and processing one or more patches), receives a patch 217 to generate a new file, File C 208. The patch for File C 208 contains some content that can be found in File B 209 and some content that is found in File A' 210 as described with reference to FIG. 4.

Figure 3:
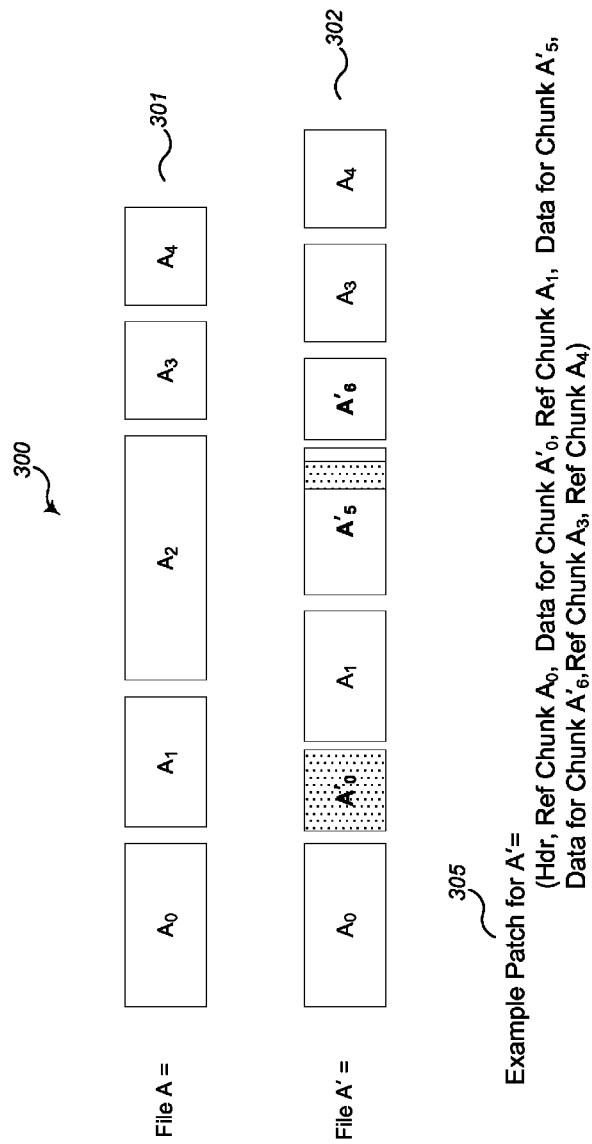
FIG. 3 is a block diagram illustrating an example single file patch produced by a Cross-File Differential Content Synchronization System for synchronizing an update to a file modified on a client.

FIG. 3 is a block diagram illustrating an example single file patch produced by a Cross-File Differential Content Synchronization system for synchronizing an update to a file modified on a client. Example 300 illustrates how a patch is generated in client 201a in FIG. 2 to upload the changes made to File A 204 to be stored on server 220, for example, as File A' 224b, a new version. In this example, File A' denotes a modified version of File A. The chunks 301 represent the chunks of File A that result from applying a chunking algorithm that divides the file into segments of data content. File A is shown divided into five separate chunks: $A_0$ to $A_5$. File A' represented by chunks 302 is shown containing seven different chunks, four of which are identical to those contained in File A: chunks $A_0$, $A_1$, $A_3$, and $A_4$. Three of the chunks 302 are new or modified, either because they contain all new data (as shown by the grey stipple), such as chunk $A'_0$, or because they contain data from a chunk of File A that has been modified, such as chunk $A'_5$ which contains some modifications to chunk $A_2$ from File A. Specifically, chunk $A_2$ has been split into two new chunks in File A': a chunk $A'_5$ which contains modifications and a chunk $A'_6$ which contains data from File A.

Patch 305 is an example patch that is generated by client 201a to perform a differential sync to create the modifications to File A, here named as File A'. (Note that the modifications can be thought of as a new file, a new file version, or modifications to File A, depending upon the implementation.) For the purposes of FIG. 3, File A' is treated as a more recent version of File A. In an example patch format according to CDCSS techniques, patch 305 consists of a header, followed by a reference to chunk $A_0$ in File A, followed by data content for chunk $A'_0$, followed by a reference to chunk $A_1$ in File A, followed by data content for chunk $A'_5$, followed by data content for chunk $A'_6$, followed by a reference to chunk $A_3$ in File A, followed by a reference to chunk $A_4$ in File A.

In general, according to one embodiment, a patch consists of one or more segments (e.g., records, items, etc.) following a header, which imparts certain information about the patch such as a patch identifier, a format indicator, an indicator of the length of the file that should result from applying the patch, and an indicator of the media type of the resulting file. Each segment of the patch is either a data record, which identifies that size and type of the data content contained therein or a reference record, which contains a tuple that indicates a unique file identifier (e.g., File ID or UUID) of the file that contains the data, version identifier, offset (e.g., a byte offset to the chunk of data in the referred to file), and a hash of the chunk (e.g., a SHA-256 hash). A recipient can use the hash to verify the retrieved data by computing the hash of retrieved data based upon the File ID and offset and comparing it to the stored hash value. If they are not the same, the recipient can detect an error in the patch or in the stored file. In this case the recipient (e.g., the server) can notify the client that uploaded the patch that it is incorrect. In some embodiments, patch segments that contain a reference record may actually stored a separate record that defines the reference (using the File ID/UUID and version) and a separate record that indicates the location of a chunk within the reference (offset, length, hash). This allows easy creation of a manifest that provides a list of references contained within the patch.

As notable from FIG. 3, File A' causes generation of a "single file" patch 305. That is, the patch does not have references that refer to more than one file even though the patch format is capable of handling multiple files—hence the term "cross-file" patch. In such instances wherein only one file is referenced, simplifications for representation of the patch may be employed, although not necessary. In addition, a manifest later created to accompany or precede sending of the patch to other clients, may be simplified since it only refers to one file.

In other scenarios, certain other optimizations or enhancements may be incorporated into patches and/or into patch manifests. For example, a patch may be self-referential: that is, portions of the patch may refer to other portions of the patch; a patch may be compressed or contain data content that is compressed; or a patch may include insert/delete directives or other types of operators in addition to or instead of the format identified above (data and reference records). Other optimizations may be incorporated. For example, files may be segmented into chunks based upon their specific formats (e.g., format aware chunking) As an example, zip files naturally divide into sub-file boundaries, which can be further divided. Similarly, specific format chunking may be developed for formats such as MP3 to split metadata from the audio data. Also, in some embodiments patches for incremental/differential sync purposes may be only generated for files above a certain size, potentially configurable.

Figure 4:
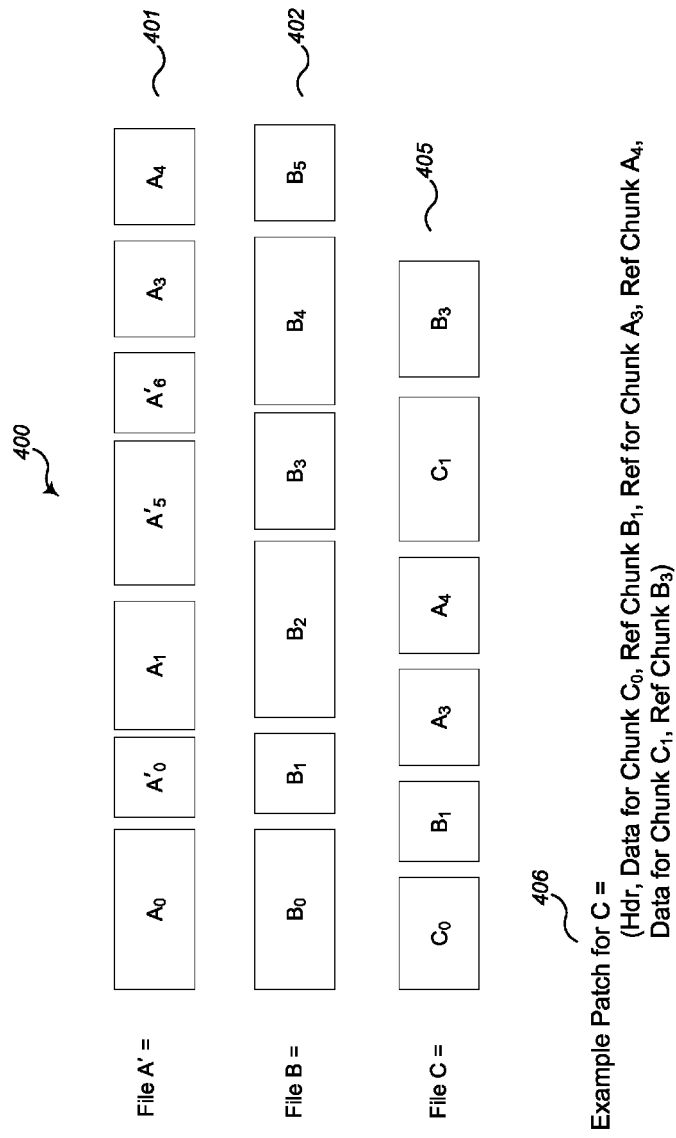
FIG. 4 is a block diagram illustrating an example cross-file patch produced by a Cross-File Differential Content Synchronization System for synchronizing an update to a file generated by another client.

FIG. 4 is a block diagram illustrating an example cross-file patch produced by a Cross-File Differential Content Synchronization system for synchronizing an update to a file generated by another client. Example 400 illustrates how a patch is processed in client 201c in FIG. 2 to download a patch that can be used to generate File C, from File B and File A'. In this example, File A' denotes a the most recent version of File A. The chunks 401 represent the chunks of File A' described with reference to FIG. 3. File A' is shown divided into seven separate chunks. The chunks 402 represent the chunks of File B (File B 209 in FIG. 2) previously downloaded to client 201c. The chunks 405 represent the data chunks of File C (File C 208 in FIG. 2) formed from new data content chunks $C_0$ and $C_1$ and from data within Files A' and File B (chunks $A_3$ and $A_4$ and chunks $B_1$ and $B_3$, respectively).

In an example patch format according to CDCSS techniques, patch 406 consists of a header, followed by data content for chunk $C_0$, followed by a reference to chunk $B_1$ in File B, followed by a reference to chunk $A_3$ in File A', followed by a reference to chunk $A_4$ in File A', followed by data content for chunk $C_1$, followed by a reference to chunk $B_3$ in File B.

Figure 5:
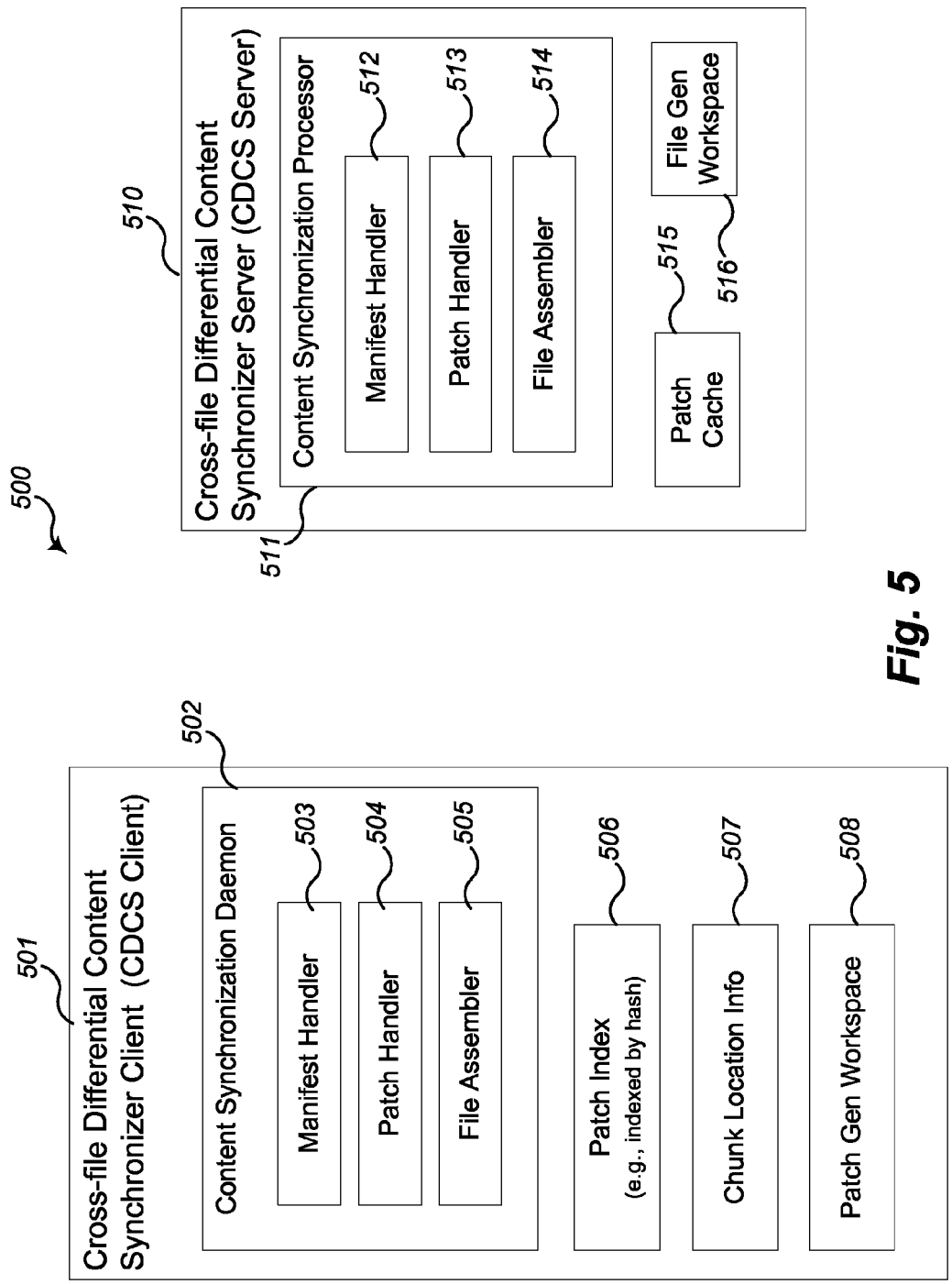
FIG. 5 is a block diagram illustrating of components of an example Cross-File Differential Content Synchronization client process and an example Cross-File Differential Content Synchronization server process.

FIG. 5 is a block diagram illustrating of components of an example Cross-File Differential Content Synchronization client process and an example Cross-File Differential Content Synchronization server process. In one embodiment, the Cross-File Differential Content Synchronization System comprises one or more functional components/modules that work together to synchronize content differences in an optimized manner. These components may be implemented in software or hardware or a combination of both. According to illustration 500, a Cross-File Differential Content Synchronization System comprises a CDCS Client 501 and a CDCS Server 510. The CDCS Client 501 comprises a Content Synchronization Daemon process 502, a patch index 506, a chunk location information 507, and a patch generation workspace. The CDCS Server 510 comprises a Content Synchronization Processor 511, a patch cache 515, and a file generation workspace 516.

As explained with reference to FIG. 1, the content synchronization daemon (process) 502 executes on the client and is responsible for generating patches to upload new and modified files to a server and for processing patches to download new and modified files. In one embodiment, the process 502 monitors a known folder on the client system to determine when files have been changed. Monitoring also can be accomplished by subscribing to certain operating system event handling. When a change is made to a file (according to the system events subscribed to), the file is read, indexed, and the process 502 determines whether and when to synchronize the change. In an alternative embodiment, the process 502 may execute as part of the I/O drivers or hierarchy. Additionally, the process 502 may scan a folder hierarchy to determine when files have been changed. This may happen in conjunction with subscribing to events, or executing as part of a driver hierarchy, or, in other embodiments, may provide a sole mechanism for monitoring. Other mechanisms may similarly be incorporated for daemon 502 to determine when to generate or process patches.

Process 502 further comprises or is associated with a manifest handler 503, a patch handler 504, and a file assembler 505. The manifest handler processes a manifest when, for example, it is received from a server, to make sure the referenced (referred-to) files that are referenced by an upcoming or accompanying patch are truly available. If they are not available or are otherwise in error, the client 501 has the option of requesting the full file content for the file being downloaded or of accepting the patch anyway and requesting specific content (even specified by location and number of bytes) from, for example the server, to fill in the missing parts thereby "repairing" the broken references. In such case, a server might be programmed to handle errors and repair a stored patch (e.g., a patch cached in patch cache 515. In one embodiment, the patch is not downloaded until and unless a recipient client verifies that the patch can be applied by processing the manifest.

The patch handler 504 is responsible for processing a received patch. Processing patches (whether by a recipient server or by a recipient client) is described further with reference to FIG. 7. Patches can be processed in a sequential pipeline manner, a segment at a time, and the resultant file built by file assembler 505.

As described with reference to FIG. 1, the patch index 506 (local chunk index) indexes content chunks of all files on the client using, typically, a cryptographic hash. These indexed hash values are independent of any hash or other algorithm used to help segment the files into chunks and can be derived using separate algorithms. Each index key (e.g., a hash value) resolves to location information for a chunk of content. In some embodiments, the location information is stored in a separate repository 507. In other embodiments it is stored as part of the patch index 506 directly. The patch index 506 is used to generate patches for clients acting as producers of new or modified file data in order to forward the patches to synchronize files. As described elsewhere, when new or modified data is encountered, hashes of its chunks are looked up as index keys in the patch index 506 and, if they exist, a reference to existing data is placed in the patch being generated; if they do not exist, the data content itself is stored in the patch being generated. In some embodiments, a patch generation workspace 508 is included in the CDCS client 501 to aid in the generation of patches.

Similarly, the content synchronization processor 511 of the CDCS server 510 includes a manifest handler 512, a patch handler 513, and a file assembler 514. The manifest handler 512 is responsible for generating a manifest for a received patch (e.g., before a patch is propagated to another client). The patch handler 513 receives patches from clients who are syncing files and forwards (e.g., sends, conveys, communicates, etc.) cached patches stored in patch cache 515 to recipient other clients. The file assembler 514 is used to assemble the new or modified file as the patch is being processed. The file is assembled in the file gen workspace 516 by copying data directly from the patch to the new (or new version of a) file or by retrieving data from a file referenced by the patch according to the stored location information, size, etc.

In one embodiment, the content synchronization processor 511 of the CDCS server 510 is implemented using REST application programming interfaces (API) and thus available as Software As A Service (SAAS) or as other web available resources. A web server acting as the processor 511 fields requests for files and returns patches wherever possible.

Although the techniques of CDCSS are generally applicable to any type of file, the phrase "file" is used generally to imply any type of object from which differential content can be determined. Also, although the examples described herein often refer to a server file system, the techniques described herein can also be used locally, remotely with a network file system, or in other architectures to promote de-duplication. For example, the techniques described herein may be used with files stored in any type of file system, objects stored in any type of data store, or any linear byte stream of data. In addition, the concepts and techniques described are applicable to other architectures, patch protocols, devices, etc. Essentially, the concepts and techniques described are applicable to any file or object synchronization.

Also, although certain terms are used primarily herein, other terms could be used interchangeably to yield equivalent embodiments and examples. In addition, terms may have alternate spellings which may or may not be explicitly mentioned, and all such variations of terms are intended to be included.

Figure 6:
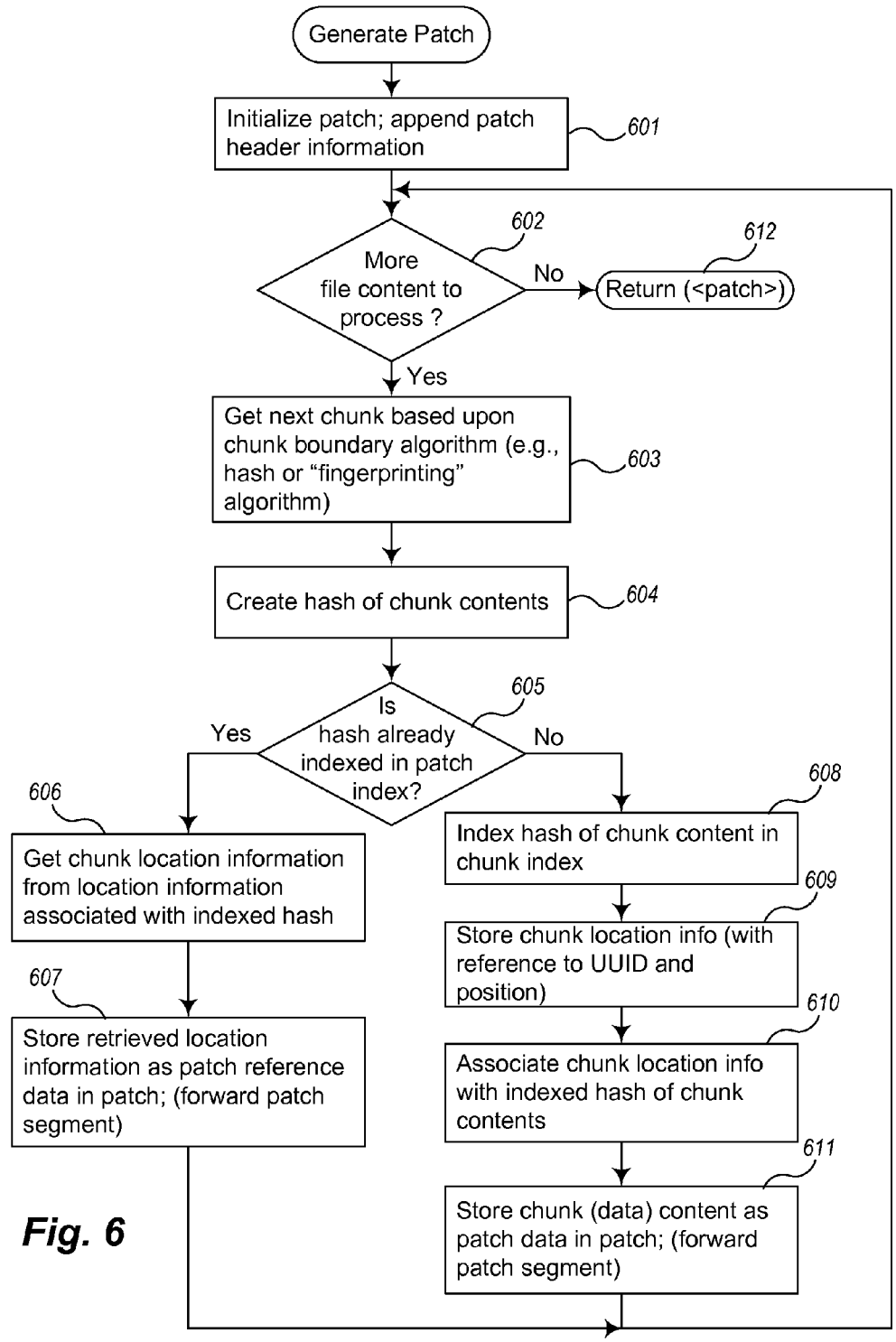
FIG. 6 is an example flow diagram of logic to generate a patch for use in a Cross-File Differential Content Synchronization System.

Example embodiments described herein provide applications, tools, data structures and other support to implement a Cross-File Different Content Synchronization System to be used for synchronizing content of a file. Other embodiments of the described techniques may be used for other purposes including de-duplication generally. In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the logic, different logic, etc. Thus, the scope of the techniques and/or functions described are not limited by the particular order, selection, or decomposition of aspects described with reference to any particular routine, module, component, and the like FIG. 6 is an example flow diagram of logic to generate a patch for use in a Cross-File Differential Content Synchronization System. The logic of FIG. 6 may be used by a CDCS Client, e.g., sync daemon 102 in FIG. 1, to generate a patch for a new or modified file. In block 601, a patch data structure is initialized and header information is added that identifies the patch. Optionally, additional information such as a version of the patch format, the length of the resulting file, and the media type of the file being generated can also be included in the header. In blocks 602-611, the logic executes a loop to process each chunk of data content of the new or modified file. In particular, in block 602, the logic determines whether there are more chunks to process and if so continues in block 603, else terminates in block 612. In instances where the patch is returned and forwarded to, for example, a server, at the end of processing the entire patch, then the patch is returned in block 612. Otherwise, the logic just returns as the patch has already been forwarded.

In block 603, the logic obtains the next chunk of data content of the file based upon whatever chunking algorithm is used. As described earlier, in one embodiment a Rabin fingerprinting algorithm, which implements content-defined chunking (CDC), is used to break up a file's data content into segments that can be compared for determining what content has changed. In other embodiments, other algorithms may be used, including, for example, MD5 or SHA-1 hashes. The algorithms chosen can be implemented in a system that supports a client-side only cache, wherein the server need not have a copy of the cache nor be aware of the chunking algorithm in order to process a patch.

In block 604, a separate representation value, for example, a strong cryptographic hash value such as SHA-256, is computed to index the chunk previously determined according to the chunk boundary algorithm. In block 605 the logic uses this value as a "key" into a patch index to determine whether the data content represented by the value (hash) is already indexed. If so, then the logic continues in block 606 to obtain location information for the data content to use in a reference in the patch being generated, otherwise continues in block 608 to formulate a new indexed record and to store the data content directly in the patch being generated.

In particular, if the (hash) key indicates that the data content is already present in the patch index, then in block 606 the logic obtains chunk location information from the location information associated with the indexed (hash) value. Then, in block 607, this retrieved location information is added as a patch reference data in the patch being generated. In some embodiments, a manifest for the patch being generated is also generated while the patch is being generated. In such a case, along with block 607, the logic can generate a record in the manifest that corresponds to the newly created patch reference in the patch. Further, in embodiments that support sequential, or streamline processing, the new segment of the patch being generated is forwarded (e.g., sent, communicated, etc.) to the server (directly or indirectly). The logic then returns to the beginning of the loop in block 602.

If on the other hand the (hash) key indicates that the data content is not found in the patch index, then in block 608, the (hash) key for the new or modified content chunk is indexed and in block 609 the location information associated with the new or modified content chunk is stored. For example, a UUID for the file, a position within the file where the chunk can be found, and a length of the chunk may be stored. In block 610, this stored location information is then associated with the newly indexed (hash) key. In one embodiment, blocks 609 and 610 are performed in tandem as the location data is stored directly in the patch index. In other embodiments, the location information may be stored separately, for example, in a separate data repository which is cross referenced from the patch index.

In block 611, the new or modified content is stored as patch data in a segment of the patch being generated. Then, in embodiments that support sequential, or streamline processing, the new segment of the patch being generated is forwarded to the server (directly or indirectly). The logic then returns to the beginning of the loop in block 602.

Figure 7:
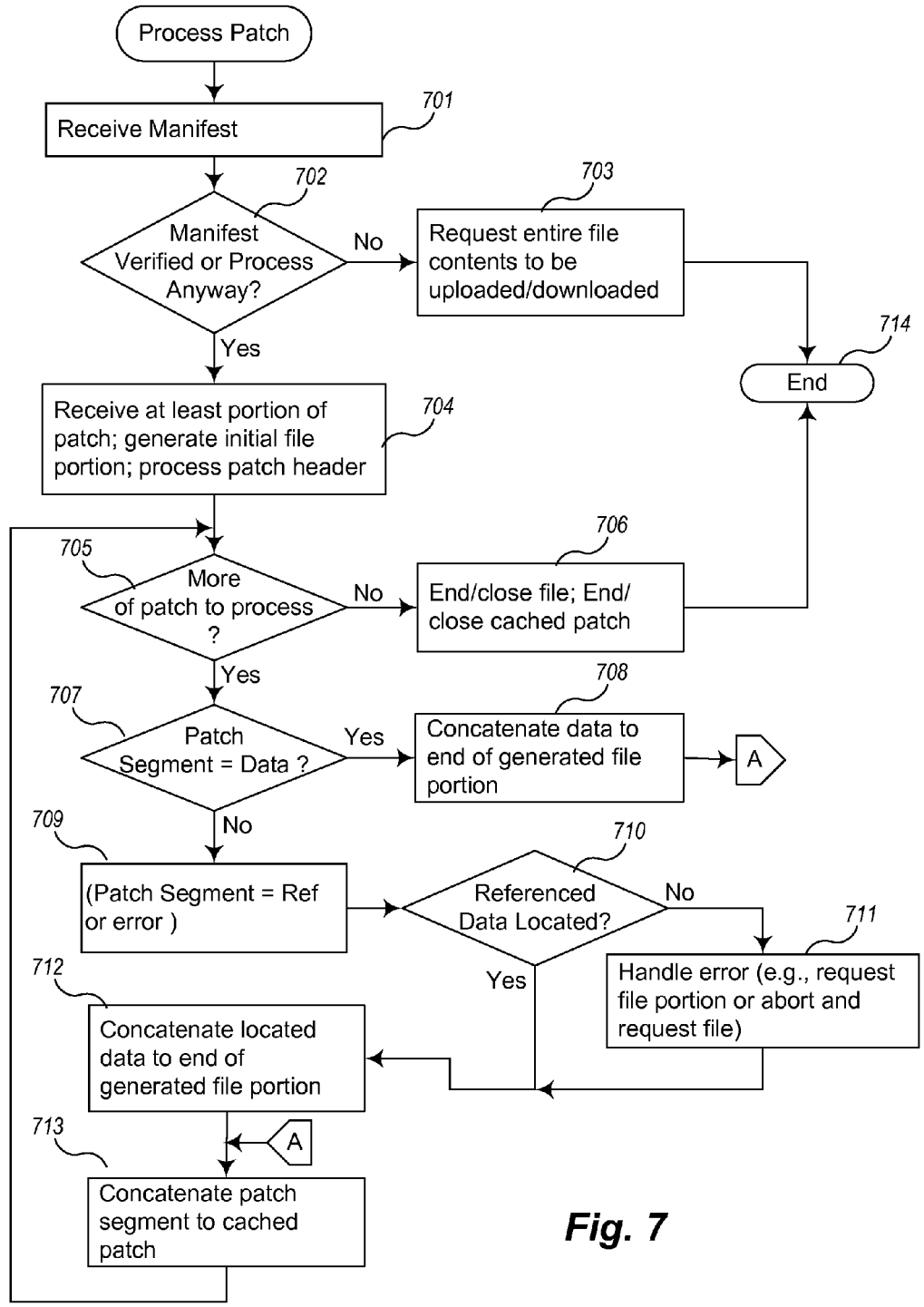
FIG. 7 is an example flow diagram of logic to process a patch for use in a Cross-File Differential Content Synchronization System.

FIG. 7 is an example flow diagram of logic to process a patch for use in a Cross-File Differential Content Synchronization System. The logic of FIG. 7 may be used by a CDCS Client, e.g., sync daemon 102 in FIG. 1 or a CDCS Server, e.g., a sync processor 121, to process a received patch for a new or modified file. Although slight differences may apply to processing by the server or by a consumer client, the basic logic described here is applicable to both.

In block 701, assuming a manifest is available, it is received. In block 702, the logic reviews the list of files contained in the manifest records to determine that it has access to all of the files referred to therein. If so, or if the logic determines it will process the patch anyway, then the logic continues in block 704, otherwise continues in block 703. In block 703, the logic determines and requests that the entire file contents needs to be uploaded/downloaded, and then the logic ends 714.

In block 704, the logic receives at least a portion of the patch, generates an initial portion of the file to be created, and processes the patch header.

Blocks 705 through 713 implement a loop for processing each segment of the patch. In particular, in block 705, the logic determines whether there are more segments in the patch to process. If not, then the logic continues in block 706, otherwise continues in block 707.

In block 706, the logic ends or otherwise closes the file being created and closes or otherwise ends the patch being cached (in the case the logic is executed by a server). In some server embodiments, a manifest is created while processing the patch (for future consumers) and, if so, the manifest is closed. The logic then proceeds to block 714 to end processing.

In block 707, the logic determines whether the next patch segment is a data segment (contains data content) and if so, continues in block 708, otherwise continues in block 709. In block 708, the logic reads the data content from the patch and appends it to the end of the file portion generated thus far, and continues in block 713.

In block 709, the logic determines whether (presumes that) the next patch segment is a reference (or an error) and proceeds to block 710. In block 710, the logic determines whether data in the referenced file has been located. If so, the logic continues in block 712, otherwise continues in block 711 to handle the error. Handling the error may include, for example, requesting data for a specific portion of the file, aborting the patch processing, or even requesting the whole file. The logic then continues in block 712.

In some embodiments, in block 710 the logic retrieves the referred to data, computes its own hash value for the retrieved data, and then compares the computed hash to a hash value stored with the patch record that provided a reference to the data. In this manner, the logic is able to verify that the data found matches that specified by the patch. If not, the error is handled according to block 711.

In block 712, the logic proceeds to concatenate (append) the located/retrieved data to the end of the file portion generated thus far, and continues in block 713.

In block 713, the logic concatenates (appends) the processed patch segment to the patch being cached and returns to the beginning of the patch segment processing loop in block 705. In embodiments in which a manifest is created while processing the patch (e.g., for future consumers), then a record is added to the manifest to correspond to the reference contained in the patch segment examined in block 709. The logic then returns to the beginning of the loop to process the next patch segment in block 705.

Figure 8:
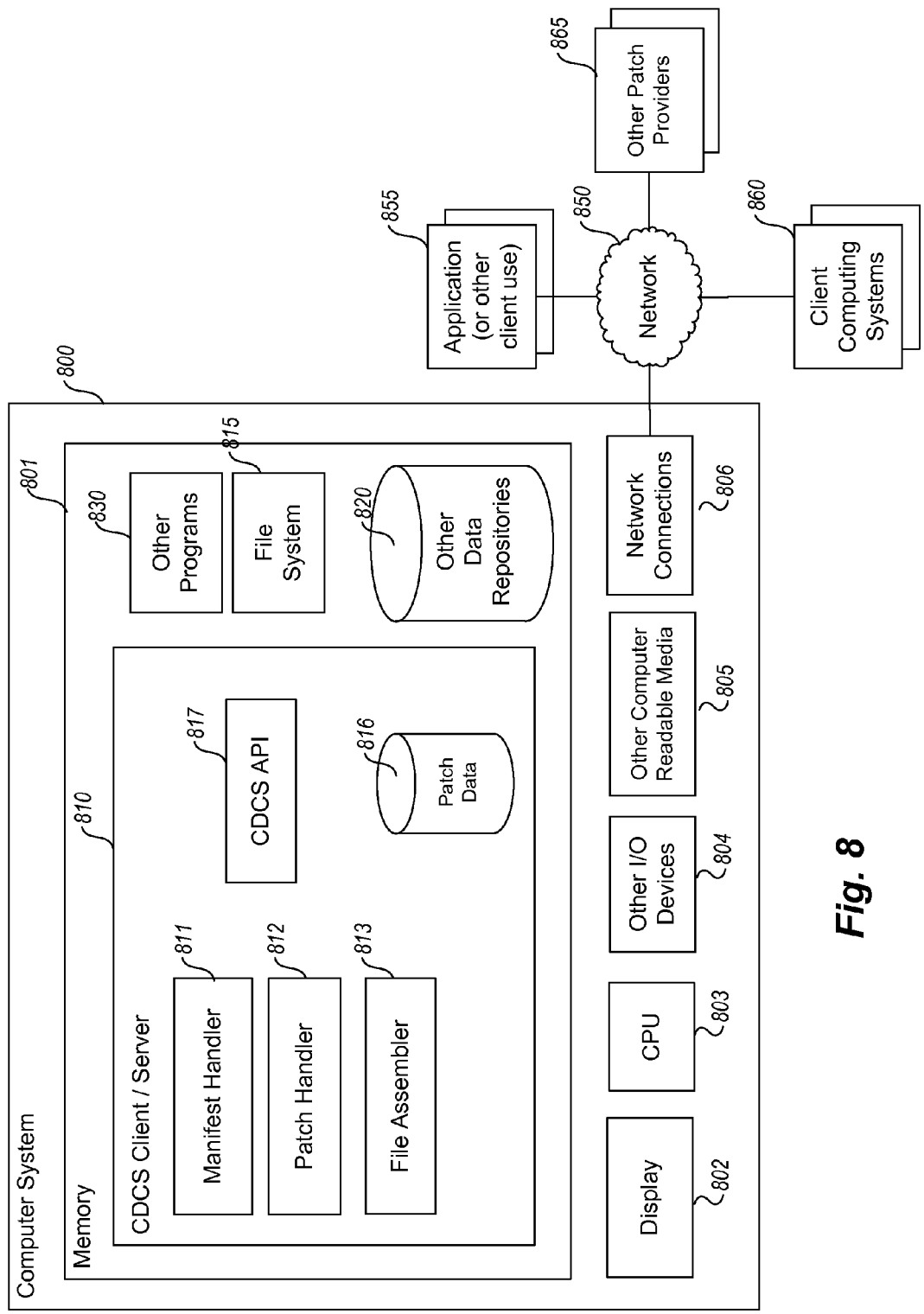
FIG. 8 is an example block diagram of an example computing system that may be used to practice embodiments of a Cross-File Differential Content Synchronization System described herein.

FIG. 8 is an example block diagram of an example computing system that may be used to practice embodiments of a Cross-File Differential Content Synchronization System described herein. Note that a one or more virtual or physical general purpose computing systems suitably instructed or a special purpose computing system may be used to implement a CDCSS. Further, the CDCSS may be implemented in software, hardware, firmware, or in some combination to achieve the capabilities described herein.

The computing system 800 may comprise one or more server and/or client computing systems and may span distributed locations. In addition, each block shown may represent one or more such blocks as appropriate to a specific embodiment or may be combined with other blocks. Moreover, the various blocks of the CDCSS 810 may physically reside on one or more machines, which use standard (e.g., TCP/IP) or proprietary interprocess communication mechanisms to communicate with each other.

In the embodiment shown, computer system 800, for use as a client or as a server, comprises a computer memory ("memory") 801, a display 802, one or more Central Processing Units ("CPU") 803, Input/Output devices 804 (e.g., keyboard, mouse, CRT or LCD display, etc.), other computer-readable media 805, and one or more network connections 806. The CDCSS (client or server) 810 is shown residing in memory 801. In other embodiments, some portion of the contents, some of, or all of the components of the CDCSS 810 may be stored on and/or transmitted over the other computer-readable media 805. The components of the CDCSS 810 preferably execute on one or more CPUs 803 and manage the generation and processing of patches, as described herein. Other code or programs 830 and potentially other data repositories, such as data repository 806, also reside in the memory 801, and preferably execute on one or more CPUs 803. Of note, one or more of the components in FIG. 8 may not be present in any specific implementation. For example, some embodiments embedded in other software may not provide means for user input or display.

In a typical embodiment, the CDCSS (client or server) 810 includes one or more manifest handlers 811, one or more patch handlers 812, and one or more file assemblers 813. In at least some embodiments, a patch is provided external to the CDCSS client or server and is available, potentially, over one or more networks 850. Other and/or different modules may be implemented. In addition, the CDCSS may interact via a network 850 with application or client code 855 that uses patches computed by a CDCS client 810, one or more client computing systems 860, and/or one or more third-party patch providers 865. Also, of note, for computing systems that host CDCS client code, the patch data 816 may include a patch index which may be made accessible to other systems over network 850.

In an example embodiment, components/modules of the CDCSS 810 are implemented using standard programming techniques. For example, they may be implemented as a "native" executables running on the CPU 803, along with one or more static or dynamic libraries. In other embodiments, the components of the CDCS client or CDCS server 810 may be implemented as instructions processed by a virtual machine. A range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use well-known or proprietary, synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously and communicate using message passing techniques. Equivalent synchronous embodiments are also supported.

In addition, programming interfaces to the data stored as part of the CDCSS client or CDCSS server 810 (e.g., in the data repository 816) can be available by standard mechanisms such as through C, C++, C#, and Java APIs; libraries for accessing files, databases, or other data repositories; through scripting languages such as XML; or through Web servers, FTP servers, or other types of servers providing access to stored data. The patch data 816, including a patch index when computing system 800 is a client, may be implemented as one or more database systems, file systems, or any other technique for storing such information, or any combination of the above, including implementations using distributed computing techniques.

Also the example CDCSS 810 may be implemented in a distributed environment comprising multiple, even heterogeneous, computer systems and networks. Different configurations and locations of programs and data are contemplated for use with techniques of described herein. In addition, the server and/or client may be physical or virtual computing systems and may reside on the same physical system. Also, one or more of the modules may themselves be distributed, pooled or otherwise grouped, such as for load balancing, reliability or security reasons. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.) and the like. Other variations are possible. Also, other functionality could be provided by each component/module, or existing functionality could be distributed amongst the components/modules in different ways, yet still achieve the functions of a CDCSS.

Furthermore, in some embodiments, some or all of the components of the CDCSS 810 may be implemented or provided in other manners, such as at least partially in firmware and/or hardware, including, but not limited to one or more application-specific integrated circuits (ASICs), standard integrated circuits, controllers executing appropriate instructions, and including microcontrollers and/or embedded controllers, field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., a hard disk; memory; network; other computer-readable medium; or other portable media article to be read by an appropriate drive or via an appropriate connection, such as a DVD or flash memory device) to enable the computer-readable medium to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

All of the above U.S. patents, U.S. patent application publications, U.S. patent applications, foreign patents, foreign patent applications and non-patent publications referred to in this specification and/or listed in the Application Data Sheet are incorporated herein by reference, in their entireties.

From the foregoing it will be appreciated that, although specific embodiments have been described herein for purposes of illustration, various modifications may be made without deviating from the spirit and scope of the present disclosure. For example, the methods and systems for performing file synchronization discussed herein are applicable to other architectures other than a client-server architecture. Also, the methods and systems discussed herein are applicable to differing protocols, communication media (optical, wireless, cable, etc.) and devices (such as wireless handsets, electronic organizers, personal digital assistants, tablets, portable email machines, game machines, pagers, navigation devices such as GPS receivers, etc.)

The invention claimed is:

1. A computer-implemented method in a server computing system for synchronizing content of a file, comprising:
    receiving a patch from a client computing system that is separate and distinct from the server computing system, the patch comprising a plurality of segments, each segment corresponding to one portion out of a plurality of portions of the file to be synchronized, the file being divided into the plurality of portions based on a chunking algorithm, each segment containing data content or a reference to data content;
    processing each segment of the received patch to create a new file, until the end of the received patch is detected, wherein,
        when the segment contains data content, appending the data content to the new file;
        wherein, when the segment contents a reference to data content, attempting to locate the referred to data content and, when the referred to data content is located, appending the located data content to the new file; and otherwise when the referred to data content is not located, requesting a copy of a reference file from the client computing system that contains the referred to data content, and when the reference file is received, locating the referred to data content in the reference file and appending the data content located in the reference file to the new file.

2. The method of claim 1, further comprising:
    storing the received patch in a local cache on the server computing system; and
    providing the stored patch to another client computing system upon receiving a request for the new file.

3. The method of claim 2 wherein the received patch is stored for a period of time and when the period expires, the stored patch is removed from the local cache.

4. The method of claim 3 wherein the period of time is configurable.

5. The method of claim 3 wherein, when a request is received for the new file after the stored patch has been removed from the local cache, providing a copy of the entire data content of the new file.

6. The method of claim 2 wherein the received patch is expunged from the local cache according to an algorithm.

7. The method of claim 6 wherein the algorithm is at least one of least frequently used, least recently used, or first-in-first-out.

8. The method of claim 1 wherein the patch is received in portions and the processing of each segment occurs as the segments are received.

9. The method of claim 8 wherein the patch is received one segment at a time.

10. The method of claim 1 wherein the referred to data content is located in a file previously stored in a file system associated with the server computing system.

11. The method of claim 1 wherein the patch contents are smaller than the entire data content of the new file.

12. The method of claim 1, further comprising:
    receiving a request from another client computing system for the new file; and
    providing the received patch to the another client computing system instead of the entire data content of the new file.

13. The method of claim 1 wherein the new file is created by storing the appended data content in a temporary space.

14. The method of claim 1 wherein the received patch contains at least one segment that contains a reference to data content from a first file and at least one segment that contains a reference to data content from a second file that is distinct and separate from the first file.

15. The method of claim 1 wherein, when the segment contains a reference to data content and the referred to data content appears to be located, computing a hash value of the data content and comparing the computed hash value of the data content to a hash value stored in the segment.

16. The method of claim 1, further comprising:
    receiving a manifest that contains indications to locations referred to by references to data content contained in the received patch.

17. The method of claim 16, further comprising:
    processing the received manifest to determine whether the indicated locations are indeed available before processing each segment of the received patch.

18. The method of claim 1, wherein the method is deployed as software as a service.

19. A non-transitory computer readable storage medium for synchronizing a file in a server, comprising one or more sequences of instructions, the instructions when executed by one or more processors causing the one or more processors to execute the operations of:
    receiving a patch from a client that is separate and distinct from the server computing system, the patch comprising a plurality of segments, each segment corresponding to one portion out of a plurality of portions of the file to be synchronized, the file being divided into the plurality of portions based on a chunking algorithm, each segment containing data content or a reference to data content; and
    processing each segment of the received patch to generate a new file, wherein,
        when the segment contains data content, appending the data content to the new file; and wherein, when the segment contents a reference to data content, attempting to locate the referred to data content and, when the referred to data content is located, appending the located data content to the new file.

20. The storage medium of claim 19 wherein the storage medium is a memory in a computing system and content are instructions.

21. The storage medium of claim 19, further comprising:
when the referred to data content is not located when processing a segment, requesting a copy of a reference file from the client that contains the referred to data content, and when the reference file is received, locating the referred to data content in the reference file and appending the data content located in the reference file to the new file.

* * * * *